United States Patent
Olsson et al.

(10) Patent No.: US 11,807,437 B2
(45) Date of Patent: Nov. 7, 2023

(54) LIQUID FOOD PACKAGING MATERIAL, SYSTEM AND METHOD FOR APPLYING AN OPENING TO THE PACKAGING MATERIAL

(71) Applicant: Tetra Laval Holdings & Finance S.A., Pully (SE)

(72) Inventors: Sverker Olsson, Sodra Sandby (SE); Paul Tragardh, Loddekopinge (SE); Par Rydberg, Genarp (SE); Thomas Schuman, Hjarup (SE); Kristina Juuso Brylander, Limhamn (SE); Paolo Nasi, Modena (IT); Matiulla Shaikh, Bunkeflostrand (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/772,999

(22) PCT Filed: Oct. 25, 2018

(86) PCT No.: PCT/EP2018/079306
§ 371 (c)(1),
(2) Date: Jun. 15, 2020

(87) PCT Pub. No.: WO2019/115075
PCT Pub. Date: Jun. 20, 2019

(65) Prior Publication Data
US 2020/0391919 A1    Dec. 17, 2020

(30) Foreign Application Priority Data
Dec. 15, 2017  (EP) ..................................... 17207669

(51) Int. Cl.
*B65D 65/40* (2006.01)
*B32B 1/02* (2006.01)
(Continued)

(52) U.S. Cl.
CPC ................ *B65D 65/40* (2013.01); *B32B 1/02* (2013.01); *B32B 3/266* (2013.01); *B32B 15/00* (2013.01);
(Continued)

(58) Field of Classification Search
CPC ...... B65D 65/40; B65D 5/4212; B65D 5/746; B65D 85/72; B65B 3/025; B65B 3/04;
(Continued)

(56) References Cited

U.S. PATENT DOCUMENTS

| 5,078,268 A * | 1/1992 | Olson ................. B65D 5/2004 206/232 |
| 2009/0134230 A1* | 5/2009 | Stojak ................... B65D 65/10 235/494 |

(Continued)

FOREIGN PATENT DOCUMENTS

| CN | 211165705 | 8/2020 |
| WO | WO 2015/140097 | 9/2015 |

OTHER PUBLICATIONS

International Search Report and Written Opinion for PCT/EP2018/079306, dated Oct. 25, 2018, in 6 pages.

*Primary Examiner* — James C Yager
(74) *Attorney, Agent, or Firm* — Knobbe, Martens, Olson & Bear, LLP

(57) ABSTRACT

A laminated packaging material for liquid food products may include a paper board having a non-white color or a film arranged on the paper board, and a pre-laminated hole arranged in an opening section of the paper board. A first contrast area may be arranged adjacent to the pre-laminated hole and printed in a first color that is selected such that a high contrast between the first color and the pre-laminated hole is achieved.

6 Claims, 5 Drawing Sheets

(51) Int. Cl.
  *B32B 3/26* (2006.01)
  *B32B 27/10* (2006.01)
  *B65B 3/02* (2006.01)
  *B65B 3/04* (2006.01)
  *B65D 5/42* (2006.01)
  *B65D 5/74* (2006.01)
  *B65D 85/72* (2006.01)
  *B32B 15/00* (2006.01)
  *B32B 29/00* (2006.01)

(52) U.S. Cl.
  CPC .............. *B32B 27/10* (2013.01); *B32B 29/00* (2013.01); *B65B 3/025* (2013.01); *B65B 3/04* (2013.01); *B65D 5/4212* (2013.01); *B65D 5/746* (2013.01); *B65D 85/72* (2013.01); *B32B 2255/12* (2013.01); *B32B 2255/205* (2013.01); *B32B 2307/402* (2013.01); *B32B 2439/62* (2013.01); *B32B 2439/70* (2013.01); *Y10T 428/1303* (2015.01)

(58) Field of Classification Search
  CPC ....... B65B 61/186; B32B 29/00; B32B 15/00; B32B 1/02; B32B 3/266; B32B 27/10; B32B 2255/12; B32B 2255/205; B32B 2307/402; B32B 2439/62; B32B 2439/70; B32B 7/12; B32B 27/12; B32B 2307/75; B32B 2307/4023; B32B 2255/10; B32B 2439/40; Y10T 428/1303
  See application file for complete search history.

(56) References Cited

U.S. PATENT DOCUMENTS

| | | |
|---|---|---|
| 2010/0016137 A1 | 1/2010 | Benedetti et al. |
| 2012/0138634 A1 | 6/2012 | Benkoe et al. |
| 2012/0211550 A1* | 8/2012 | Jahn .................. G09F 3/02 229/87.01 |
| 2017/0073102 A1 | 3/2017 | Borasi et al. |

* cited by examiner

LIQUID FOOD PACKAGING MATERIAL, SYSTEM AND METHOD FOR APPLYING AN OPENING TO THE PACKAGING MATERIAL

TECHNICAL FIELD

The invention relates to a liquid food packaging material being non-white colored or comprising a film. Specifically to a liquid food packaging material for folding into a container having an opening. More specifically positioning of an opening based on contrast enhancements of the liquid food packaging material.

BACKGROUND ART

Today carton-based packaging material for liquid food containers are normally white and then printed with various graphics like figures, logos or the like. As known today, many pourable food products, such as fruit juice, UHT (ultra-high-temperature treated) milk, wine, tomato sauce, etc., are sold in containers made of such laminated packaging material.

The packaging material has a multilayer structure comprising a base layer for stiffness and strength, which may comprise a layer of fibrous material, e.g. paper or paperboard, or of mineral-filled polymer material, and which is covered on both sides with layers of thermoplastic material, e.g. polyethylene film. In the case of aseptic packages for long-storage products, such as UHT milk, the packaging material comprises a layer of oxygen-barrier material, e.g. aluminum foil and is in turn covered with another layer of thermoplastic material forming the inner face of the container eventually contacting the food product. Containers of these sorts are produced on fully automatic packaging machines, operating at high-speed, by forming and sealing packages, filled with liquid food.

Once formed, or while being formed, the containers may undergo further processing, such as the application of an opening device to enable the product to be poured out.

At present, the most commonly marketed opening devices comprise a frame portion defining a pour opening and fitted about a removable or pierceable portion of a top wall of the package; and a cap hinged or screwed to the frame portion, and which is removable to open the container.

In particular, each opening device may be applied to a corresponding so-called "pre-laminated" or laminated pre-cut hole of the packaging material, i.e. a pre-cut hole formed in the paper board and any additional print substrate material layer on the paper board, and covered by the other laminate layers, including the layer of the gas-barrier material.

Systems for applying the opening devices to the containers are known in which the containers are advanced by a conveying unit, for example a conveyor belt defining a substantially horizontal plane and supporting the containers. The system further comprises an applying device having applying elements that receives an opening device from a delivery unit, advances the opening device through a gluing unit, in which a layer of glue is distributed on a frame portion of the opening device, and then applies the opening device to a wall, in particular to a top wall, of the container.

The system further comprises a sensor, for example a camera, which detects the position of the containers, and in particular of the pre-laminated hole, and generates a signal which controls the applying elements to position and set the opening device on the container at the position of the pre-laminated hole.

A drawback of todays systems is that the opening device may be improperly applied to the container. In particular, in case the container is not aligned with the applying element—for instance in case the container is tilted on the conveyor belt—the opening device is not arranged in the right position, for example it is not centered on the pre-laminated hole. In this way, the final container may be defective. Since this is done in an automatic way by e.g. using a camera based system it is even so that some systems have issues with detecting the pre-laminated hole such that the opening can be applied on to the container.

SUMMARY

It is an object of the invention to at least partly overcome one or more of the above-identified limitations of the prior art. In particular, it is an object to overcome the issues with detecting the pre-laminated hole and especially on non-white colored packaging material or packaging material comprising a film.

According to a first aspect, a laminated packaging material for liquid food products comprising, a paper board having a non-white color or a film arranged on the paper board, a pre-laminated hole, arranged in an opening section of the paper board, and wherein a first contrast area is arranged adjacent to the pre-laminated hole and printed in a first color that is selected such that a high contrast between the first color and the pre-laminated hole is achieved.

According to a second aspect, a system for producing a liquid food packaging material comprising, a printing unit for printing on a paper board having a non-white color or a film arranged on the paper board, a first contrast area adjacent to a pre-laminated hole and print in a first color that is selected such that a high contrast between the first color and the pre-laminated hole is achieved, and a drying unit for drying the liquid food packaging material comprising the first contrast area.

According to a third aspect, a method of producing a packaging material for liquid food products comprising the steps of, supplying a paper board having a non-white color or a film arranged on the paper board and having a pre-laminated hole, arranged in an opening section of the paper board, printing a first contrast area adjacent to the pre-laminated hole and printed in a first color that is selected such that a high contrast between the first color and the pre-laminated hole is achieved.

According to a fourth aspect, a liquid food container comprising,
a paper board having a non-white color or a film arranged on the paper board, a pre-laminated hole, arranged in an opening section of the paper board, and wherein a first contrast area is arranged adjacent to the pre-laminated hole and printed in a first color that is selected such that a high contrast between the first color and the pre-laminated hole is achieved.

According to a fifth aspect, a method of producing a liquid food container comprising the steps of, providing a packaging material for liquid food products, folding the packaging material into an at least partly complete container.

Further examples of the invention are defined in the dependent claims, wherein features for the second, third, fourth and fifth aspects of the disclosure are as for the first aspect mutatis mutandis.

The paperboard may have a film arranged on the paperboard, which is a holographic film or a metallized film.

The first contrast area may at least partly surround the pre-laminated hole, and may thus in an embodiment surround the pre-laminated hole.

In an embodiment, the first contrast area may have an area that is at least 5%, 10%, 20 or 35% larger than the pre-laminated hole.

The laminated packaging material may further comprise a plurality of opening identification marks, arranged at the pre-laminated hole and printed in a second color, and the method of producing a laminated packaging material may thus further comprise a step of printing such a plurality of opening identification marks.

The laminated packaging material may further comprise a second contrast area at the plurality of opening identification marks and printed in a third color that is selected such that a high contrast between the second color of the identification marks and the third color of the second contrast area is achieved. The method of producing a laminated packaging material may thus further comprise a step of printing a second contrast area at the plurality of opening identification marks and printed in a third color that is selected such that a high contrast between the second color of the identification marks and the third color of the second contrast area is achieved.

The identification marks may be shaped differently from each other, and the method may thus comprise printing the identification marks with shapes different from each other.

The laminated packaging material may further comprise a two-dimensional code and a third contrast area arranged at the two-dimensional code, the third contrast area being selected such that high contrast is achieved between the two-dimensional code and the third contrast area.

Some examples of the disclosure provide for a packaging material comprising a film that is a holographic film or a metallized film.

Some examples of the disclosure provide for a high contrast between a first color and a pre-laminated hole.

Some examples of the disclosure provide for a first color and that color being selected far away from a color of a pre-laminated hole.

Some examples of the disclosure provide for a color having a hue and/or a luminosity chosen such that a high contrast between that color and a pre-laminated hole is achieved.

Some examples of the disclosure provide for an opening applicator system.

Some examples of the disclosure provide for a vision system for detecting a pre-laminated hole.

Some examples of the disclosure provide for a simpler and/or cheaper vision system for detecting a pre-laminated hole.

Some examples of the disclosure provide for a first color that is selected from the CMYK or NCS color space.

Some examples of the disclosure provide for a packaging material that is customizable with different kinds of optical effects that gives an appealing effect.

Some examples of the disclosure provide for easily detecting an edge of a pre-laminated hole of a packaging material.

Some examples of the disclosure provide for an optical resolution of a vision system to be low.

Some examples of the disclosure provide for identification marks to also align an opening device on and in relation to a packaging material.

Some examples of the disclosure provide for a second and third color to be selected from a color pair of black-white, red-green, blue-orange, red-cyan, green-magenta, blue-yellow, yellow-purple, blue-orange, or vice versa of the pairs.

Some examples of the disclosure provide for a second and third color being selected from the CMYK or NCS color space.

Some examples of the disclosure provide for a reduction of any optical phenomena's between an identification mark and a second contrast area.

Some examples of the disclosure provide for shapes that will have a same optical phenomena.

Some examples of the disclosure provide for a higher probability of a vision system to recognize identification marks.

Some examples of the disclosure provide for a more unique combination for a vision system.

Some examples of the disclosure provide for QR codes.

The current invention has been disclosed in relation to different examples of a packaging material comprising a pre-laminated hole. It should also be understood that the invention also covers a liquid food packaging material without the pre-laminated hole, or that the pre-laminated hole is performed after the packaging material is contrast enhanced as disclosed herein. Such packaging material can use different kinds of openings that are capable of penetrating through the packaging material when the correct position is decided based on the identification marks and/or the contrast area(s). It is also disclosed herein that a film is arranged on the paper board and this is to be understood as not exclusively arranged on the paper board but other intermediate layers may of course also exist between the paper board and the film such as, glue, plastic compositions and so on. The film is a polymer film and may be a printable film arranged on one side of the paperboard or be a film laminated to the other side of the paperboard, to cover at least partly the packaging material, such as a barrier film or a heat sealable film. Further, it should be understood that a paper board having a non-white color is to be understood that the paper board can be colored itself or that the paper board can be treated afterwards by e.g. completely printing the paper board in a color or otherwise treat it to have a color different from white.

The term laminate is to be understood to comprise at least a paperboard and a further layer, such as a plastic layer being substantially adhered to the paperboard.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
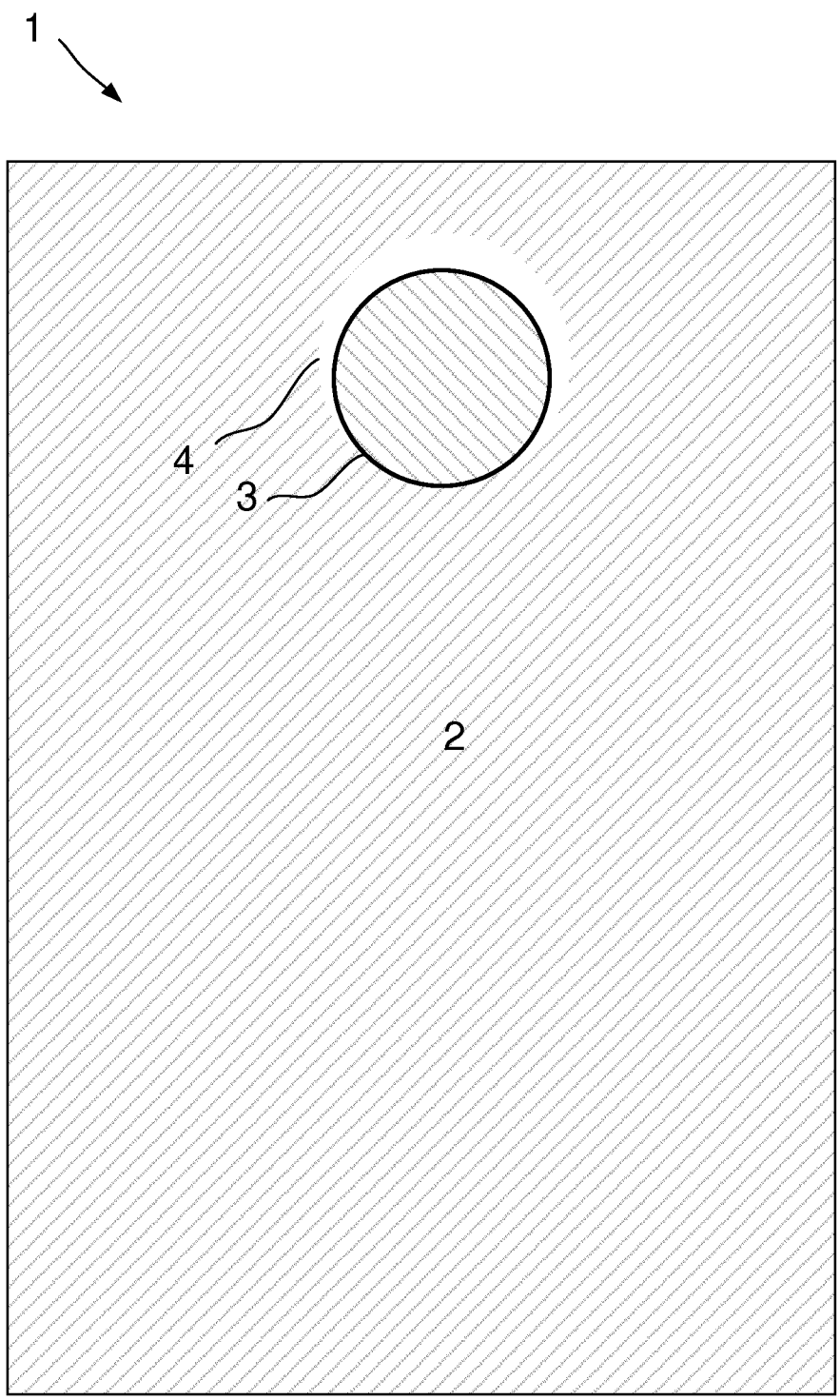
FIG. 1 is a front view of a liquid food packaging material comprising a pre-laminated hole and a first contrast area.

With reference to FIG. 1 an example of a laminated packaging material 1 for liquid food products is illustrated. The packaging material 1 comprises a paper board having a non-white color 2 or a film 2 arranged on the paper board and a pre-laminated hole 3 arranged in an opening section of the paper board. The packaging material 1 also comprises a first contrast area 4 that is arranged adjacent to the pre-laminated hole 3 and printed in a first color that is selected such that a high contrast between the first color and the pre-laminated hole 3 is achieved. By having the contrast area 4 being printed in the first color that color being selected as far away from the color of the pre-laminated hole 3 in a color hue and/or in luminosity a high contrast between the two are achieved. This high contrast can for example be used together with an opening applicator system, and such a system may then use a vision system for detecting the pre-laminated hole 3 and its position on the packaging laminate 1 so that an opening can be applied to cover the pre-laminated hole 3 in e.g. a precise and exact manner. It also means that the higher contrast that is achieved between the first color and the pre-laminated hole 3, the simpler and cheaper the vision system can be. For instance, the vision system in the opening applicator can use less light, cheaper optics, cheaper sensors and so on in order to detect the pre-laminated hole 3. In an example, the first color is selected as white, but other colors are of course also possible as long as a high contrast is achieved for detecting the pre-laminated hole 3. In a further example, the first color is selected as black. In an example the first contrast area is has a width that is at least 0.3 mm from the pre-laminated hole 3 and outwards. In an example, the first color is selected from the CMYK or NCS color space. In an example the pre-laminated hole 3 is a hole 3 without any lamination.

In an example, the film 2 is a holographic film or a metallized film. By having a holographic or metalized film as the film 2 on the packaging material 1, the packaging material 1 is customizable with different kinds of optical effects that gives an appealing effect for a final container.

Figure 2:
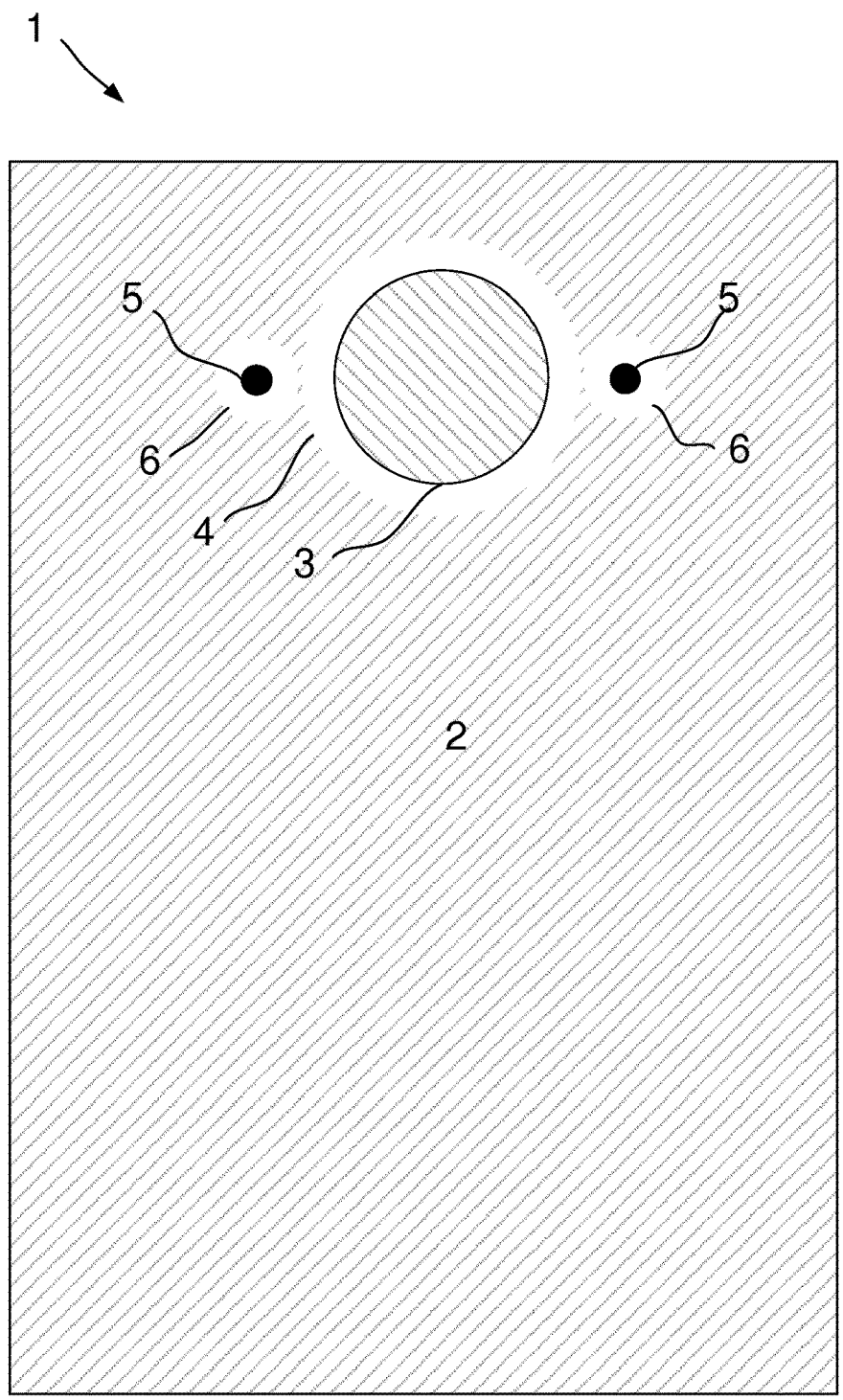
FIG. 2 is a front view of a liquid food packaging material comprising a pre-laminated hole, identification marks and a first and second contrast area.

In an example illustrated in FIG. 2, the first contrast area 4 at least partly surrounds the pre-laminated hole 3. By having the first contrast area 4 at least surrounding the pre-laminated hole 3 it is possible to more easily detect the edge of the packaging material 1 at the pre-laminated hole 3 and thus apply the opening to it. The more the first contrast 4 surrounds the pre-laminated hole 3 the easier it is to detect the edge along the entire packaging material 1 at the pre-laminated hole 3 and thus apply the opening at a desired position. In an example, illustrated in e.g. FIG. 2, the first contrast area 4 surrounds the pre-laminated hole 3.

In an example illustrated in e.g. FIGS. 1-3c, the first contrast area 4 has an area that is at least 5%, 10%, 20 or 35% larger than the pre-laminated hole 3. By having the contrast area 5 being larger than the identification mark 4 an optical resolution of the vision system need to be lower in order to being capable of optically resolve the identify the identification marks 4 from the non-white paper board 2 or the coated background 2. In an example an area of the contrast area 5 is chosen based on the optimal optical resolution of the vision system. In other examples the area of the contrast area 5 is even larger than 100% or less than 50% of the identification mark 4.

In an example, illustrated in e.g. FIG. 2, the packaging material 1 further comprises a plurality of opening identification marks 5, arranged adjacent to the pre-laminated hole 3 and printed in a second color. By having these identification marks 5 it is possible to in addition to finding the pre-laminated hole 3 also align the opening on and in relation to the packaging material 1.

In an example, illustrated in e.g. FIG. 2 the packaging material 1 further comprises a second contrast area 6 at the plurality of opening identification marks 5, and printed in a third color that is selected such that a high contrast between the second color of the identification marks 5 and the third color of the second contrast area 6 is achieved. In an example the second and third color are selected from a color pair of black-white, red-green, blue-orange, red-cyan, green-magenta, blue-yellow, yellow-purple, blue-orange, or vice versa of the pairs. In an example, the second and third color is selected from the CMYK or NCS color space. As with the difference between the first color of the first contrast area 4 and the pre-laminated hole 3, the second and third colors are chosen for a highest contrast as possible and so that an opening applicator having a vision system can easily identify these identifiers for applying an opening to the packaging material 1. In an example, the identification marks 5 are at least 0.8 mm in diameter.

In an example, illustrated in e.g. FIG. 2, the second contrast area 6 is shaped complementary to a shape of the identification marks 5 such as circular, square, rectangular or oval. By having the second contrast area 6 shaped complementary to the identification marks 5 or being any other common shape, it is possible to reduce any optical phenomena's between the identification mark 5 and the second contrast are 6, since the shapes will have the same potential optical phenomena.

Figure 3A:
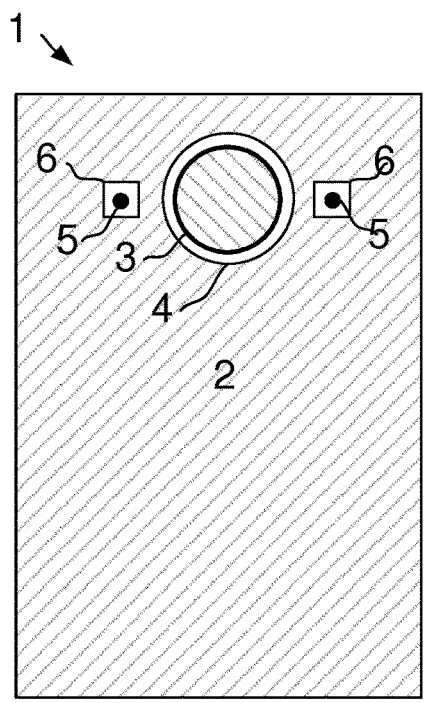
FIG. 3a is a front view of a liquid food packaging material comprising identification marks and a second contrast area that has a different shape form the identification marks.
Figure 3B:
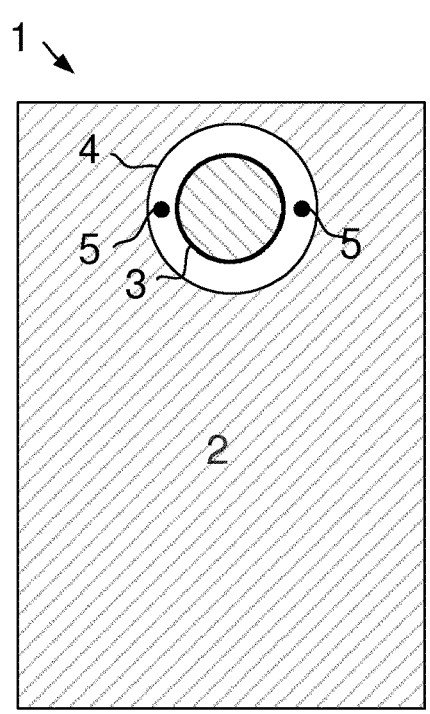
FIG. 3b is a front view of a liquid food packaging material comprising a pre-laminated hole, identification marks and a first and second contrast area are the same.

In an example, illustrated in e.g. FIG. 3a a different shape is used for the second contrast area 6 compared to the shape of the identification marks 5. In an example the first 4 and second 6 contrast area are separated from each other. In an example, illustrated in e.g. FIG. 3b, the first 4 and the second contrast area 6 are the same.

Figure 3C:
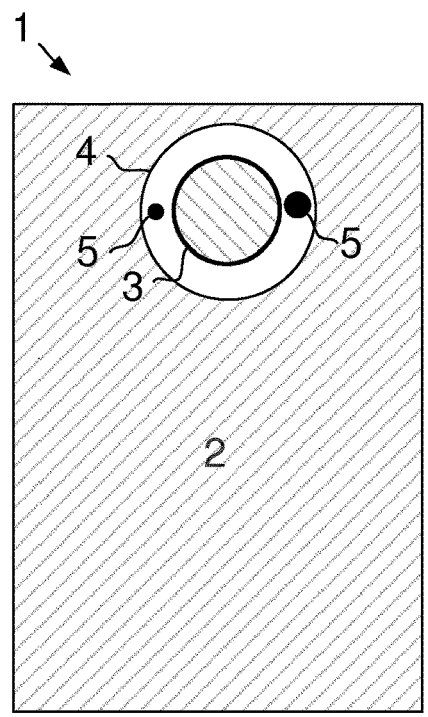
FIG. 3c is a front view of a packaging material comprising identification marks with a different shape from each other.

In an example illustrated in e.g. FIG. 3c, the identification marks 4 are shaped different from each other. By having different shaped identification marks 4 there is a higher probability for the vision system to recognize the identification marks 4 and not see them as noise, i.e. a more unique combination for the vision system to look for is made.

Figure 4:
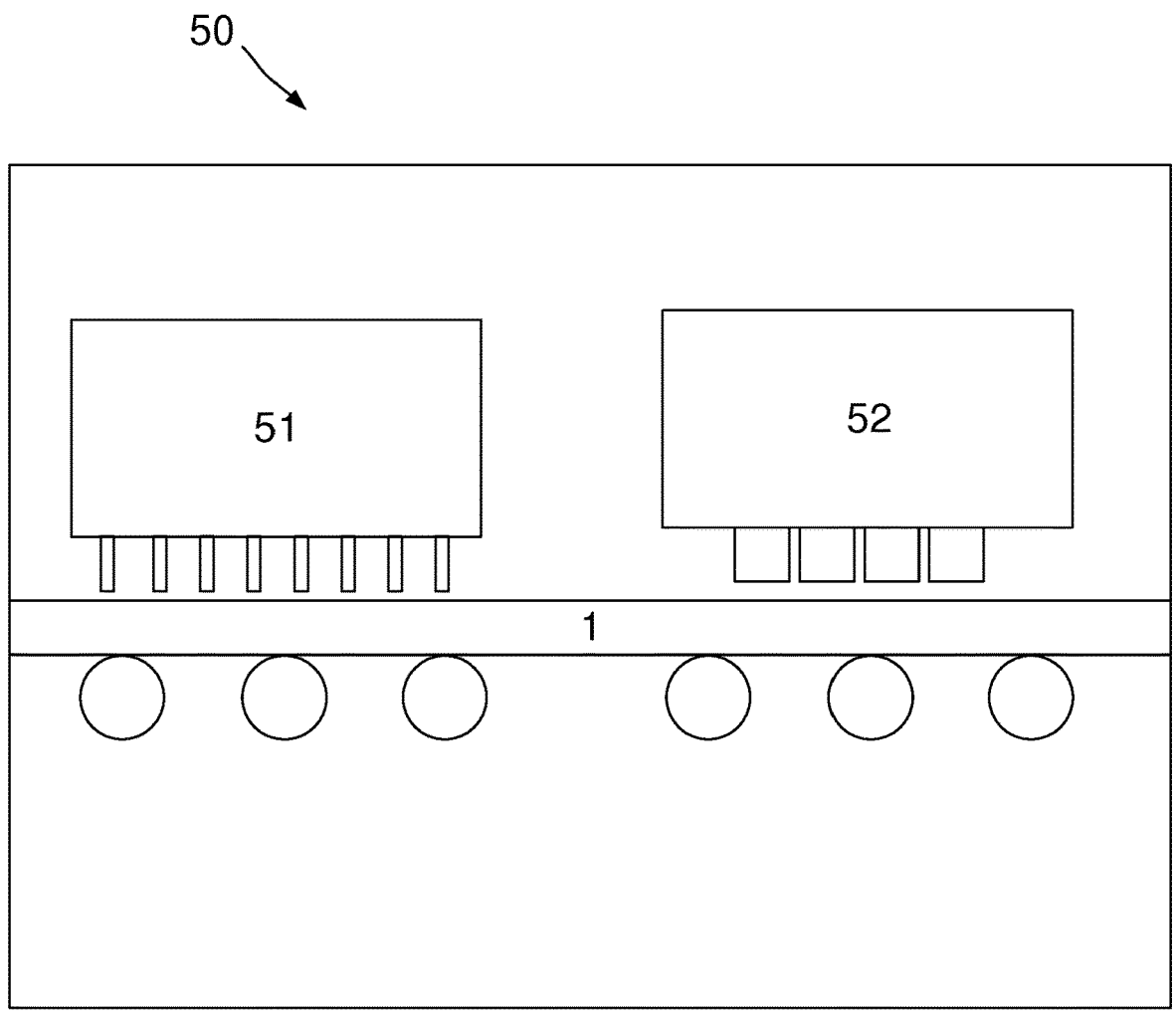
FIG. 4 is a schematic side view of a system for producing packaging material for liquid food comprising a pre-laminated hole and a first contrast area.

In an example, with reference to FIG. 4 a system 50 for producing a liquid food packaging material 1 is illustrated. The system 50 comprises a printing unit 51 for printing on the paper board having a non-white color 2 or a film 2 arranged on the paper board. The printing unit 51 is adapted to print the first contrast area 4 adjacent to the pre-laminated hole 3 and print in the first color that is selected such that a high contrast between the first color and the pre-laminated hole 3 is achieved. Additionally, the system 50 comprises a drying unit 52 for drying the liquid food packaging material 1 comprising the first contrast area 4. In an example, the printing unit 51 is an inkjet printer, flexographic printer, offset printer or a rotogravure printer. In an example, the drying unit 52 is an infrared dryer, hot air dryer, a contact dryer or other common dryer.

Figure 5:
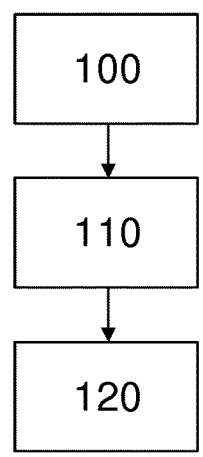
FIG. 5 is a flow-chart of a method of producing a liquid food packaging material.

In an example, with reference to FIG. 5 a method of producing 100 a packaging material 1 for liquid food products is illustrated. The method 100 comprises the steps of supplying 110 the paper board having a non-white color 2 or a film 2 arranged on the paper board and having the pre-laminated hole 3, arranged in an opening section of the laminated paperboard. The method 100 further comprises printing 120 the first contrast area 4 adjacent to the pre-laminated hole 3 and print it in a first color that is selected such that a high contrast between the first color and the pre-laminated hole 3 is achieved.

In an example, the supplying of the paper board that has a film is a paper board having a holographic film or a metallized film. In an example, the first contrast area 4 is printed to at least partly surround the pre-laminated hole 3. In another example, the first contrast area 4 is printed to surround the pre-laminated hole 3. In an example, the first contrast area 4 is printed with an area that is at least 5%, 10%, 20 or 35% larger than the pre-laminated hole 3.

In an example, the method 100 further comprises a step of printing the plurality of opening identification marks 5, arranged at the pre-laminated hole 3 and printed in a second color. In yet an example, the method 100 further comprises a step of printing the second contrast area 6 at the plurality of opening identification marks 5 and print in a third color that is selected such that a high contrast between the second color of the identification marks 5 and the third color of the second contrast area 6 is achieved. In an example, the identification marks 5 are printed with a shaped different from each other.

Figure 6:
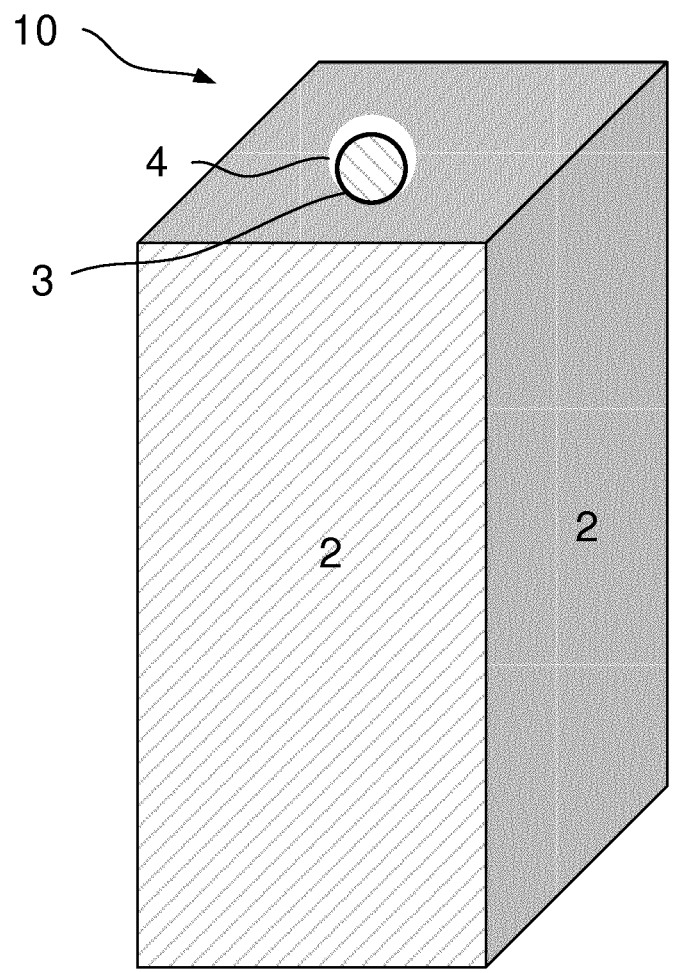
FIG. 6 is a perspective view of a container made from a packaging material comprising a non-white colored or film, a pre-laminated hole and a first contrast area.

In an example with reference to FIG. 6, a liquid food container 10 comprising, a paper board having a non-white color 2 or a film 2 arranged on the paper board is illustrated. The liquid food container 10 also comprises a pre-laminated hole 3, arranged in an opening section of the paper board. The liquid food container 10 also comprises a first contrast area 4 arranged adjacent to the pre-laminated hole 3 and printed in a first color that is selected such that a high contrast between the first color and the pre-laminated hole 3 is achieved. The same effects and advantages described above in relation to the packaging material 1 are as well true for the liquid food container 10 described herein since the packaging material 1 is used to form the liquid food container 10.

Figure 7:
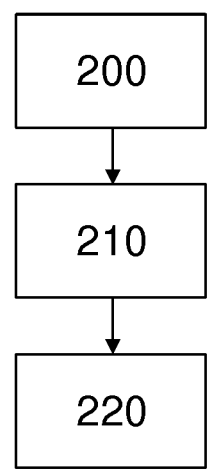
FIG. 7 is a flow-chart of a method of producing a liquid food container.

In an example with reference to FIG. 7, a method 200 of producing a liquid food container 10 is illustrated. The method comprises the steps of, providing 210 a packaging material 1 for liquid food products, and folding 220 the packaging material 1 into an at least partly complete container 10.

In an example, the method of producing a liquid food container 10 further comprises the steps of filling the at least partly folded container 10, sealing the at least partly folded container 10, and applying an opening device on the filled and sealed container 10.

The applying of the opening device may also be done before the step of at least partly folding 220 of the container 10, such that filling and sealing of the container 10 is done after applying the opening device. Alternatively, the opening device may be applied after the step of at least partly folding 220 the container 10 but before filing the container 10 with any liquid and further sealing the container 10. In an example, the opening device is applied after the container 10 has been folded, filled but before any sealing of the container 10. In an example, an opening applicator system is used to apply openings on the packaging material 1 described above. The applicator system comprises a vision system, a conveyor for conveying the containers 10 and an opening applicator. The vision system detects the pre-laminated hole 3 with the help of the first contrast area 4 and then the opening applicator applies the opening on to the container 10 at the detected position of the pre-laminated hole 3 by the vision system.

In an example a QR code, bar code or other 2D or 1D codes are printed on the packaging material 1. A third contrast area can be printed at the QR code, in addition to or alternative to, the above described first 4 and second 6 contrast areas.

In a further example, a laminated packaging material for liquid food products comprises a paper board having a non-white color or a film arranged on the paper board. The laminated packaging material also comprises a two-dimensional code, such as a QR code, and a third contrast area that is arranged at the two-dimensional code. Hence, the difference compared to the packaging material 1 is that there may also be, or may not be, a pre-laminated hole 3, i.e. a pre-cut hole in the base layer subsequently laminated with further layers, for an opening device. All other features and effects are the same as for the packaging material 1.

The third contrast area is selected such that a high contrast between the color of the QR code and the third contrast area is achieved, as also discussed above in relation to the packaging material 1. The printing of the third contrast area can be made by an inkjet printer, flexographic printer, offset printer or a rotogravure printer, as in the examples above related to the packaging material 1.

From the description above follows that, although various embodiments of the invention have been described and shown, the invention is not restricted thereto, but may also be embodied in other ways within the scope of the subject-matter defined in the following claims.

The invention claimed is:

1. A laminated packaging material for liquid food products comprising:
   a paper board having a metal layer arranged on the paper board;
   a pre-laminated hole arranged in an opening section of the paper board;
   wherein a first contrast area is arranged adjacent to the pre-laminated hole and printed in a first color, the first color different from a color of the pre-laminated hole;
   an opening identification mark printed in a second color, the opening identification mark configured to align an opening device in relation to the packaging material, the opening identification mark positioned within a second contrast area printed in a third color; and
   wherein the second color and the third color are selected from a color pair of black-white, red-green, blue-orange, red-cyan, green-magenta, blue-yellow, yellow-purple, blue-orange, or vice versa.

2. A laminated packaging material for liquid food products according to claim 1, wherein the first contrast area at least partly surrounds the pre-laminated hole.

3. A laminated packaging material for liquid food products according to claim 1, wherein the first contrast area has an area that is at least 5%, larger than the pre-laminated hole.

4. A laminated packaging material for liquid food products according to claim 1, further comprising a plurality of opening identification marks arranged at the pre-laminated hole and printed in the second color.

5. A laminated packaging material for liquid food products according to claim 1, wherein the opening identification mark comprises
a two-dimensional code.

6. A laminated packaging material for liquid food products, comprising:
a pre-laminated hole arranged in an opening section of a paper board;
a first contrast area arranged adjacent to the pre-laminated hole and printed in a contrast color, the contrast color different from a color of the pre-laminated hole; and
an opening identification mark configured to align an opening device in relation to the packaging material and comprising a circular shape, the opening identification mark printed in a second contrast area, the second contrast area comprising a rectangular shape,
wherein the opening identification mark is printed in a second contrast color and the second contrast area comprises a third contrast color, the second contrast area spaced away from the first contrast area.

* * * * *